United States Patent [19]

Chen et al.

[11] Patent Number: 5,777,706
[45] Date of Patent: Jul. 7, 1998

[54] NEMATIC LIQUID CRYSTAL PHASE SPATIAL LIGHT MODULATOR FOR ENHANCED DISPLAY RESOLUTION

[75] Inventors: Diana Chen, Gilbert; Fred V. Richard; Phil Wright, both of Scottsdale, all of Ariz.

[73] Assignee: Motorola, Inc., Schaumburg, Ill.

[21] Appl. No.: 651,188

[22] Filed: May 17, 1996

[51] Int. Cl.[6] .............. G02F 1/1347; G02F 1/1335; G02F 1/13
[52] U.S. Cl. .............. 349/74; 349/77; 349/81; 349/118; 349/202
[58] Field of Search .................... 349/74, 77, 81, 349/202, 118

[56] References Cited

U.S. PATENT DOCUMENTS

| | | | |
|---|---|---|---|
| Re. 32,521 | 10/1987 | Fergason | 349/74 |
| 4,538,884 | 9/1985 | Masaki | 349/28 |
| 4,813,770 | 3/1989 | Clerc et al. | 349/118 |
| 4,832,457 | 5/1989 | Saitoh et al. | 349/74 |
| 5,073,010 | 12/1991 | Johnson et al. | 349/28 |
| 5,196,953 | 3/1993 | Yeh et al. | 349/119 |
| 5,568,287 | 10/1996 | Shingaki et al. | 349/74 |

*Primary Examiner*—Anita Pellman Gross
*Assistant Examiner*—Tarifur R. Chowdhury
*Attorney, Agent, or Firm*—Eugene A. Parsons

[57] ABSTRACT

A phase spatial light modulator composed of a first liquid crystal cell and one or more additional liquid crystal cells. Each of the liquid crystal cells is positioned so that their extraordinary optical axis ($N_e$) lies orthogonal to the next liquid crystal cell, and the group of cells is positioned along the optical axis of light emitted by an image source. The modulator, or scanner, thereby capable of steering substantially 100% of unpolarized light therethrough. The modulator intended for use within a display system additionally composed of an image source, driver/control circuitry and an optical magnification system. In operation, an external stimulus is applied, such as a voltage supplied by an external power source, thereby spatially changing the phase of light emitted therethrough. The scanning action enhances display resolution of the generated resultant image without an increase in the number of pixels of the image source.

31 Claims, 7 Drawing Sheets

NEMATIC LIQUID CRYSTAL PHASE SPATIAL LIGHT MODULATOR FOR ENHANCED DISPLAY RESOLUTION

FIELD OF THE INVENTION

The present invention pertains to the field of optical scanners, or beam steerers, and more particularly to the modulation of unpolarized light to generate a fully integrated image within an observer's field of view.

BACKGROUND OF THE INVENTION

The human visual system is a complex system with a great ability to absorb vast amounts of information originating in many varying formats, including visual displays. Visual displays are found in varying sizes and forms in today's world, displaying many types of information, from large visual display screens announcing scheduling information found in airports, to small visual displays, such as those incorporated into pocket calculators. Of concern in the reduction in the size of visual displays, specifically those utilized in portable electronic devices, such as portable communications equipment, or the like, is the display resolution quality and the maintenance of minimal power requirements and low manufacturing costs.

One alternative method of fabricating a miniature visual display is to utilize scanning techniques to create an integrated image generated from an image source having a minimal number of pixels. Of relevance in the reduction in size of visual displays utilizing scanning techniques, and the maintenance of resolution quality, is the human visual system's ability to process and integrate information, and the speed at which the visual system is able to do so. The human visual system can process information no faster than approximately 60 Hz. Therefore, an image that is projected and scanned within 1/60th of a second to varying positions within a visual display is seen by the eyes of the viewer as one enlarged integrated image. As an example, by moving an image of an "A" to six different locations within a visual display, at a frequency of 60 Hz, the viewer will see one integrated image composed of six "A"s. If the image is simultaneously content modulated, for example, the images are of six letters "A", "B", "C", "D", "E" and "F" that are individually and sequentially moved to six varying positions at a speed of 60 Hz., the viewer will see one integrated image composed of the six letters. This process, more commonly known as time-multiplexed imagery, can be utilized in the field of display technology through the use of scanners or beam steerers, and more specifically in the development of enhanced resolution miniature visual displays.

Scanning, or beam steering, devices utilized today aid in increasing the resolution of visual displays. These scanning devices can be found in many forms, most commonly electromechanical scanners incorporating mirrors, such as galvanometric scanners and polygonal scanners. These types of electromechanical scanners are commonly quite large in size, therefore not amenable to the incorporation into a display device that is small, lightweight, operates with low power consumption and is meant to be portable in nature. In addition, mechanical scanners are complex and thus expensive to manufacture and in many instances utilize great amounts of power during operation.

Many of the present scanning devices, in particular those utilizing liquid crystal material, are only capable of steering linearly polarized light. For present scanning devices, unpolarized light must be changed into linearly polarized light through the use of a polarizer. In this instance, 100% of the light is incident upon the polarizer and/or scanner, assuming that the polarizer is integrally formed with the scanner. During operation, approximately 50% of the light, and/or energy, is transmitted therethrough, while the remaining 50% is absorbed by the polarizer.

Thus, there is a need for a small scanning device that allows for the steering, or scanning, of 100% of unpolarized light passing therethrough, thereby generating a resultant high resolution miniature visual display.

Accordingly, it is highly desirable to provide for a scanning device, that utilizes a nematic liquid crystal phase spatial light modulator for phase modulation, thereby providing for the scanning of 100% of the unpolarized light passing therethrough.

It is a purpose of the present invention to provide a new and improved liquid crystal phase spatial light modulator for display resolution enhancement that is capable of spatially modulating 100% of the unpolarized light passing therethrough.

It is a further purpose of the present invention to provide a nematic liquid crystal phase spatial light modulator incorporated into a new and improved visual display system for display resolution enhancement, thereby allowing for the incorporation of the scanner into miniature visual displays.

It is another purpose of the present invention to provide for a method of scanning 100% of unpolarized light emitted by an image source utilizing a nematic liquid crystal phase spatial light modulator and an applied external stimulus, that can be incorporated into a miniature visual display while maintaining resolution quality of the image viewed.

SUMMARY OF THE INVENTION

The above problems and others are substantially solved and the above purposes and others are realized in a nematic beam liquid crystal phase spatial light modulator for unpolarized light that is incorporated into a visual display system composed of an image source, the modulator, or scanner, driver/control circuits and optical elements. In the preferred embodiment the phase spatial light modulator utilizes at least two nematic liquid crystal cells, aligned so that the extraordinary optical axis, the axis through which the light sees the extraordinary index of refraction, of the two cells are perpendicular to each other. The scanner, or beam steerer, is fabricated to spatially modulate the phase of substantially 100% of the light generated by an image source, generally composed of an array of light emitting devices, most commonly light emitting diodes, thereby generating a resultant integrated image and enhancing the resolution of the integrated image being viewed. It should be understood that alternative light or image generating devices can be utilized such as organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., but the general term "light emitting devices" will be utilized throughout this disclosure for the sake of simplicity.

In general, the nematic liquid crystal phase spatial light modulator of the present invention, hereinafter referred to as a nematic liquid crystal scanner, serves to spatially modulate or steer the phase of substantially 100% of the light emitted by the image source, thus the directional path of the light passing therethrough. This is accomplished based on the principle that the structural organization of the molecules, which compose the nematic liquid crystal material of each of the liquid crystal cells, is not rigid, meaning that the molecules can be easily reoriented as a direct result of an external stimulus. This exertion of an external stimulus on the liquid crystal material results in the reorientation of the molecular structure of the liquid crystal material, thereby causing the light passing therethrough to undergo a phase change that depends on the input polarization of the light. Simply stated, the phase change is a function of the external stimulus, or in the present invention, the voltage applied, yet is not necessarily linearly proportional. It should be understood that varying amounts of voltage applied to the liquid crystal cells, will result in varying phase modulations, thus varying the directional travel of the light passing therethrough.

Of concern in the operation of some liquid crystal scanners, or beam steerers, is the degree of lost energy due to the absorption of approximately 50% of the light passing therethrough by the polarizer. The nematic liquid crystal scanner of the present invention is fabricated to allow for the passage of substantially 100% of unpolarized light to pass therethrough. There is no requirement for light to first be linearly polarized by a polarizer in order to be scanned or steered by the liquid crystal material.

During the operation of the nematic liquid crystal scanner of the present invention, a voltage is applied to the scanner, thereby changing the molecular orientation of the nematic liquid crystal material contained within each liquid crystal cell. This reorientation of the molecular structure of the nematic liquid crystal material is converted to a visible change in fill factor and/or number of pixels of the generated resultant integrated image when viewed by the observer due to the directional change of light passing therethrough. More specifically, a stacked liquid crystal cell orientation is utilized, thereby spatially modulating substantially 100% of the generated light waves to produce a directional change and generate the resultant integrated image viewable by the observer. The resultant integrated image appears to have higher resolution, and higher fill factor, yet the number of active pixels on the image source remains the same.

In the preferred embodiment, the nematic liquid crystal scanner is fabricated as two nematic liquid crystal cells physically aligned and attached one on top of the other with some type of optically transparent index matching material, or alternatively fabricated to share an intermediate substrate layer. The nematic liquid crystal scanner is positioned within a miniature visual display system to operate in either a transmissive mode or a reflective mode dependent upon the structure of the display system and the desired result. When operating in a transmissive mode, the nematic liquid crystal scanner is positioned so that the light generated by the array of light emitting devices passes directly through the scanner and is scanned to create a resultant integrated image through phase modulation. When the scanner is operating in the reflective mode, the nematic liquid crystal scanner has formed on a surface a reflective element or alternatively contains reflective properties, and is positioned so that the light generated by the array passes through the scanner twice.

The scanner operates by scanning the pixels of the image source, generally by scanning sub-pixels, pixel groups, and/or sub-arrays to generate an integrated image through phase modulation. The scanning, or beam steering, serves to spatially modulate the phase, and direction of travel, of the light, thereby producing another portion of the resultant integrated image. The number of active pixels on the image source remains the same, in that no additional active area, or pixels, etc. are being utilized, yet the resolution and fill factor of the generated resultant integrated image is dramatically increased through the scanning process.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE PREFERRED EMBODIMENT

During the course of this description, like numbers are used to identify like elements according to the different figures that illustrate the invention. The present invention is based on utilizing individually addressable visible light emitting devices formed in an array, that in combination with driver/control circuitry and optical elements compose a light emitting display device, or image source, of the present invention. To increase the resolution for a given number of light emitting devices or to reduce the number of light emitting devices needed to achieve a desired resolution, scanning techniques utilizing a nematic liquid crystal phase spatial light modulator, hereinafter also referred to as a nematic liquid crystal scanner, are employed. The light emitting display device serves as the image source for a visual display system whereby a resulting integrated image is formed by scanning portions or elements of the array of light emitting devices, through the liquid crystal scanner.

thereby spatially modulating the phase of the light emitted by that portion. This phase modulation serves to change the directional travel and in essence "moves" the light to another portion of the display. This scanning action forms what appears to the observer to be a high resolution resultant integrated image. Those skilled in the art will appreciate that scanning allows a full page display to be created from a much smaller number of display devices than is necessary to generate the full page display. The resultant integrated image is viewable as one of a direct view image, a miniature virtual image, or a projected image.

The scanning process utilized in the present invention is based on the principle of spatial phase modulation, thereby altering the directional path of light emitted by portions or elements of the array of light emitting devices. Of concern in the fabrication of a resultant integrated image utilizing scanning techniques, is the loss of energy or light due to the polarization properties of the light emitted through the scanner, and those of the scanner itself. In general, liquid crystal scanners utilized today only scan or steer linearly polarized light, therefore unpolarized light must be changed to linearly polarized light before it will be effectively modulated by the liquid crystal scanner. The problem then exist that only approximately 50% of the light incident upon the polarizer, and/or scanner, passes therethrough, while the remaining 50% is absorbed by the polarizer.

In the preferred embodiment of the nematic liquid crystal scanner of the present invention, substantially 100% of the light passes therethrough and is steered. The nematic liquid crystal scanner is composed of at least two liquid crystal cells, aligned having perpendicular extraordinary optical axis. By aligning the cells in this manner, so as to have the extraordinary optical axis perpendicular to one another, and by applying separate but equal voltages across both liquid crystal cells, substantially all of the polarization effect is canceled out. Alternatively stated, the cells are aligned so that the molecular alignment of the two cells is orthogonal to each other. Accordingly, unpolarized light entering the first cell undergoes a first phase modulation prior to entering the second cell and undergoing a second phase modulation. The phase modulation of the light passing therethrough allows for all light to be steered into a chosen directional path.

In the preferred embodiment, each liquid crystal cell is composed of a plurality of liquid crystal sub-cells or defined pixels, to which an external stimulus is applied, thereby altering the molecular orientation of the liquid crystal material contained therein and resulting in a phase modulation of the light passing therethrough. This resulting phase modulation allows for the image source, having minimal pixel numbers and low fill factor, in combination with the liquid crystal scanner composed of at least two liquid crystal cells, to generate an integrated image that appears to be composed of a much greater number of pixels.

As previously stated, tie purpose of this disclosure is to provide for a nematic liquid crystal scanner to be utilized in a miniature visual display system, composed of a light emitting display device, the scanner, driver/control circuitry, and a plurality of optical elements. In the preferred embodiment, the use of the miniature liquid crystal scanner to bring about the phase modulation of the light emitted by a display device, allows for the display system to remain small in size and permits it to be incorporated into miniature visual displays such as those found in portable electronics equipment, or the like. It should be understood that various sources of light or image generating devices can be utilized such as inorganic or organic light emitting diodes (LEDs), vertical cavity surface emitting lasers (VCSELs), cathode ray tubes (CRTs), field emission displays (FEDs), electroluminescent displays, plasma displays, liquid crystal displays (LCDs), etc., which may be formed in a two-dimensional array. It should also be understood that when utilizing these alternative light or image sources, that additional filters and/or optical elements may be required in addition to those described for the preferred embodiment. The general term "light emitting devices" will be utilized throughout this disclosure for the sake of simplicity.

Figure 2:
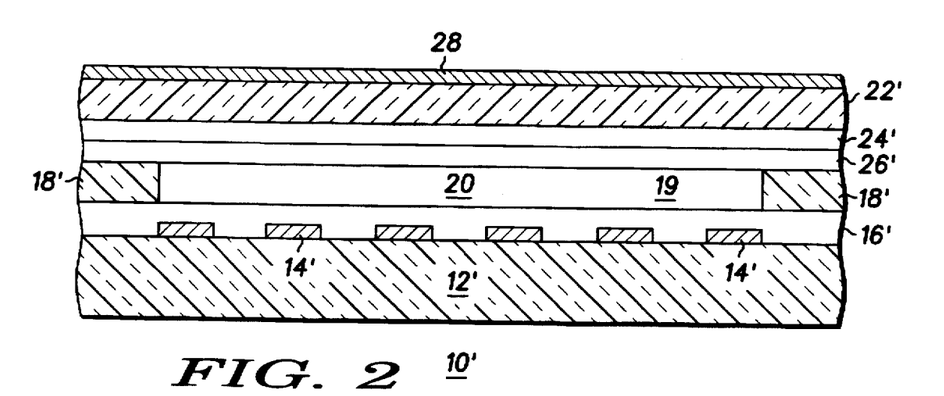
FIG. 2 is a simplified cross-sectional view of the structure of a reflective liquid crystal cell of the present invention.
Figure 3:
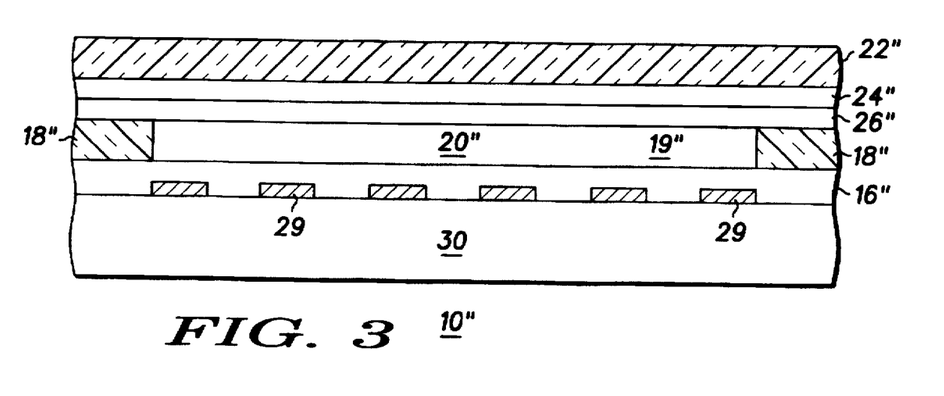
FIG. 3 is a simplified cross-sectional view of the structure of a reflective liquid crystal cell of the present invention fabricated on a silicon chip.

Referring now to the accompanying illustrations, disclosed is the nematic liquid crystal modulator, or scanner, device of the present invention. It should be understood that the preferred embodiment of the liquid crystal scanner of the present invention is generally composed of two liquid crystal cells, separate or integrally formed, aligned one on top of another. The specific structure of a liquid crystal cell, which may be utilized in the formation of the scanner is described with regard to FIGS. 1, 2 and 3 illustrating in simplified partial cross-sectional views, a transmissive liquid crystal cell 10, a reflective liquid crystal cell 10' and reflective liquid crystal cell having integrated driver circuitry 10", respectively.

Figure 1:
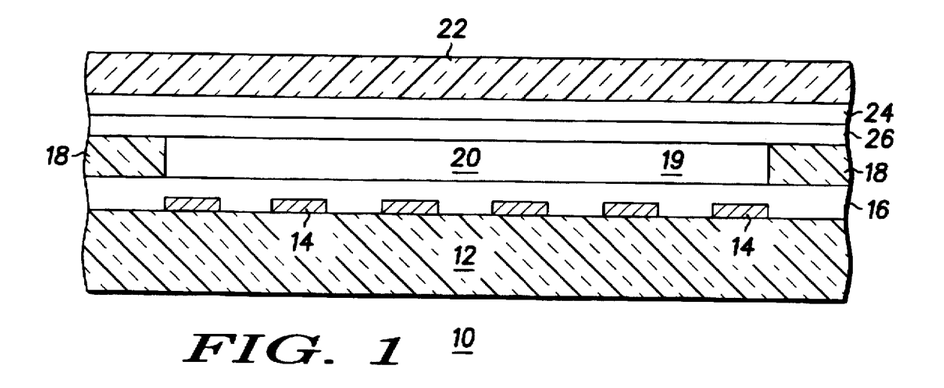
FIG. 1 is a simplified cross-sectional view of the structure of a transmissive nematic liquid crystal cell of the present invention.

Referring specifically to FIG. 1, a simplified and enlarged partial sectional view of a transmissive liquid crystal cell 10 composed completely of optically transparent material, for use when scanning in a transmissive mode (to be discussed presently), is illustrated. The use of optically transparent material allows for the positioning of transmissive liquid crystal cell 10 within a visual display system, allowing for the passage of light, emitted by the light emitting display device, to pass directly through cell 10. Transmissive liquid crystal cell 10 is generally fabricated in a stack formation and includes a substrate 12 formed of any convenient optically transparent material, such as glass. A plurality of control terminals (not shown) are formed adjacent the edges of substrate 12 and are in electrical communication with a plurality of control circuits formed of a plurality of layers of electrically conductive material (discussed presently). A first patterned electrically conductive material layer 14 is formed on an upper surface of substrate 12. First patterned electrically conductive material layer 14 is fabricated of an optically conductive material, such as indium tin oxide (ITO), thereby allowing the light impinging thereon to pass therethrough and defining an optically clear contact. A first molecular alignment, or orientation, layer 16 is positioned on the upper surface of transparent electrically conductive material layer 14. Alignment layer 16 serves to properly position and align the molecules comprising the liquid crystal material (discussed presently), so as to orient the molecules of each liquid crystal cell 10 in a specific direction when there does not exist any external stimulus, such as a voltage, acting upon the liquid crystal cell 10. More specifically, alignment layer 16 in conjunction with a second alignment layer (discussed presently) of liquid crystal cell 10 aid in aligning the molecules of each of the two liquid crystal cells 10 of the scanner of the present invention, orthogonal to one another (discussed presently).

A generally tubular glass spacer 18 is fixedly attached to the upper surface of alignment layer 16 by any convenient means, such as adhesive, chemical bonding, growing and etching layers, etc. It will of course be understood that tubular glass spacer 18 could be formed in a variety of other embodiments and the present structure is illustrated only for purposes of this explanation. Tubular glass spacer 18 has an inner opening 19 defined therethrough, of sufficient size to encircle the array of sub-cells or pixels formed by the transparent electrode patterning (to be discussed presently). The cavity defined by opening 19 in tubular glass spacer 18, having internal opposed flat surfaces, in conjunction with the upper surface of alignment layer 16, is filled with a continuous layer of nematic liquid crystal material 20. Typical examples of liquid crystal material which can be used for this purpose are disclosed in U.S. Pat. No. 4,695,650, entitled "Liquid Crystal Compounds and Compositions Containing Same", issued Sep. 22, 1987.

A glass plate 22 has a second layer of electrically conductive material 24 formed thereon, defining a second electrical contact. Together electrically conductive material layers 14 and 24 define a plurality of sub-cells (discussed presently) of liquid crystal cell 10. It will of course be understood that alternatively, electrically conductive material layer 14 could be formed as a substantially even coating while electrically conductive layer 24 is patterned to define the plurality of sub-cells. It should be understood that electrically conductive material layer 24 can alternatively also be patterned in addition to patterned electrically conductive material layer 14 and if so would be configured orthogonal to electrically conductive material layer 14 so as to define individual liquid crystal pixels. Layer 24 is formed on a lower surface of glass plate 22, and defines a second electrical contact which in conjunction with transparent electrically conductive material layer 14 can be activated to change the molecular orientation of liquid crystal material 20 of liquid crystal cell 10 of the present invention. In the preferred transmissive embodiment, the second contact is formed from an optically transparent material, such as indium-tin-oxide or the like.

The electrically conductive material layers 14 and 24 are connected by a conductive lead to a bond pad (not shown) adjacent the outer edges of tubular glass spacer 18. The bond pad is then electrically connected to a bond pad on substrate 12 by any convenient means, such as wire bond, a feed through connector in the edges of tubular glass spacer 18 (not shown), etc. The bond pad is adapted to have applied thereto a common potential, such as ground or some fixed voltage, which in cooperation with various potentials applied to the contacts activates and serves to apply a voltage to each liquid crystal pixel. A second alignment layer 26 is formed thereon a lower surface of electrically conductive material layer 24. Liquid crystal material 20 is contained within the cavity defined by the upper surface of alignment layer 16, inner opening 19 of tubular glass spacer 18 and lower surface of alignment layer 26. It will be apparent to those skilled in the art that alignment layers 16 and 26 can be formed in separate or discrete layers that are simply positioned on opposing sides of tubular glass spacer 18 and sandwiched therebetween the remaining layers during assembly.

A plurality of driver and control circuits (not shown) complete transmissive liquid crystal cell 10 which includes an array of liquid crystal sub-cells, defined by the electrically conductive material layers 14 and 24, each of which are individually addressable through a plurality of connection pads (not shown). The driver and control circuits have data input terminals and control signal output terminals connected to the array of liquid crystal scanner sub-cells through a plurality of connection or bond pads, for activating and controlling each of the liquid crystal scanner sub-cells and applying a potential, or voltage, thereto. Alternatively, when individual liquid crystal scanner pixels are defined by patterning both electrically conductive material layers 14 and 24, the electrical contacts of liquid crystal cell 10 are formed in rows and columns and the addressing and switching circuitry (not shown) includes row and column electrical buses and electronic switches coupled to the contacts so that each contact, pixel, can be individually addressed. The row and column electrical buses are electrically connected to the plurality of connection pads formed adjacent the edges of glass plate 22 for external communication (addressing and controlling) with the individual pixels. To activate the reorientation of the molecular structure of a specific portion of liquid crystal material 20, the potential, or voltage, must be applied between the upper and lower contacts for that specific pixel or sub-cell. With no potential applied, the liquid crystal material 20 is normally in a neutral condition, with molecular orientation along the extraordinary optical axis ($N_e$), otherwise stated as the axis through which the light sees the extraordinary index of refraction, and any light passing therethrough would not undergo a spatially varying phase modulation. While the present embodiment is explained using row and column drivers, it should be understood that in the alternative, thin film transistors (not shown) can be provided as an active drive device, positioned behind each liquid crystal scanner pixel or sub-cell. Thin film transistor drive devices can be utilized in either the transmissive liquid crystal cell 10 (described above), or in a reflective liquid crystal scanner (described presently). In addition, it should be understood that the nematic liquid crystal cells 10 of the present invention can be formed to be non-pixelated, contain one pixel, a plurality of pixels, or divided into sub-cells.

Referring now to FIG. 2, illustrated is a similar partial cross-sectional view of a reflective liquid crystal cell 10' according to the present invention. It should be noted that all components similar to the components illustrated in FIG. 1, are designated with similar numbers, having a prime added to indicate the different embodiment or scanning technique utilized. Reflective liquid crystal cell 10' is similar to the transmissive liquid crystal cell 10 previously described, except that there exist some element exhibiting a reflective property as part of cell 10'. Referring specifically to FIG. 2, illustrated is reflective liquid crystal cell 10', composed of an optically transparent substrate 12', optically transparent electrically conductive material layers 14' and 24', molecular alignment layers 16' and 26', glass spacer 18', liquid crystal material 20', and glass plate 22'. Liquid crystal cell 10' is generally fabricated in a stacked manner similar to transmissive liquid crystal cell 10 of FIG. 1. As with transmissive liquid crystal cell 10, a voltage is applied to cell 10', thereby activating the liquid crystal material 20', thus modulating the phase of the light passing therethrough according to the potential applied.

In the preferred embodiment, incorporating two optically transparent electrically conductive material layers 14' and 24' as illustrated in FIG. 2, a separate reflective layer 28 is provided in the liquid crystal stack so that the light passing through liquid crystal material 20', is reflected back through liquid crystal material 20' and undergoes two phase modulations within the single liquid crystal cell 10'. Reflective layer 28 is formed of any convenient reflective material, such as aluminum, or the like. In an alternative embodiment, one of the layers of electrically conductive material, such as layer 24' is formed of a reflective material, such as aluminum, the contact itself serves to reflect the light impinging thereon and the need for a separate reflective layer is eliminated. In such an embodiment, the reflective electrically conductive material can be formed of aluminum or any reflective metal that can be conveniently patterned or positioned on the surface of glass plate 22' and which will reflect light impinging thereon, reflecting it back through liquid crystal material 20', undergoing a second phase modulation within a single cell 10'.

Illustrated in FIG. 3 is a simplified partial cross-sectional view of yet another embodiment of a reflective liquid crystal cell with integrated drive circuitry, designated 10". It should be noted that all components similar to the components illustrated in FIGS. 1 and 2 are designated with similar numbers, having a double prime added to indicate the different embodiment. Liquid crystal cell 10" is essentially formed according to the above disclosed embodiment for reflective liquid crystal cell 10' in which reflective elements or layers are utilized in lieu of or in combination with the layers of electrically conductive material to define the sub-cells or liquid crystal pixels. In liquid crystal scanner 10", the drive circuitry is integrated with the scanner by forming a plurality of metal pads 29 directly on an upper surface of a silicon chip 30 having formed therein the driver circuitry. There is provided a molecular alignment layer 16" positioned on an upper surface of the metal pads 29 and silicon chip 30. A tubular glass spacer 18" is provided on an upper surface of alignment layer 16", defining an inner opening 19", or cavity therein. There is positioned within opening 19", a liquid crystal material 20", encapsulated by molecular alignment layer 16", glass spacer 18" and a second alignment layer 26". In this particular embodiment, light enters liquid crystal cell 10" through glass plate 22" in contrast to the previous liquid crystal cells 10 and 10' previously described, fabricated so that light emitted by the image source enters the cell 10 or 10' through substrate 12'.

It should be understood that while two separate alignment layers are disclosed with the varying embodiments of the reflective and transmissive liquid crystal cell fabrication, alternative fabrication utilizing only one single alignment layer is anticipated by this disclosure. There is positioned on an upper surface of alignment layer 26", a transparent layer 24" of electrically conductive material, such as indium tin oxide (ITO), serving as a second electrical connection for each sub-cell or pixel defined by the metal pads 29. A glass plate 22" is provided on an upper surface of electrically conductive material layer 24". During operation, a voltage is applied to activate the area above each metal pad, thereby reorienting the molecular structure and altering the phase of the light passing therethrough according to the potential applied. Metal pads 29 are formed of aluminum, or some convenient conductive reflective material, thereby reflecting the light back through the liquid crystal material 20" so as to cause the light to undergo a second phase modulation within cell 10".

Figure 4:
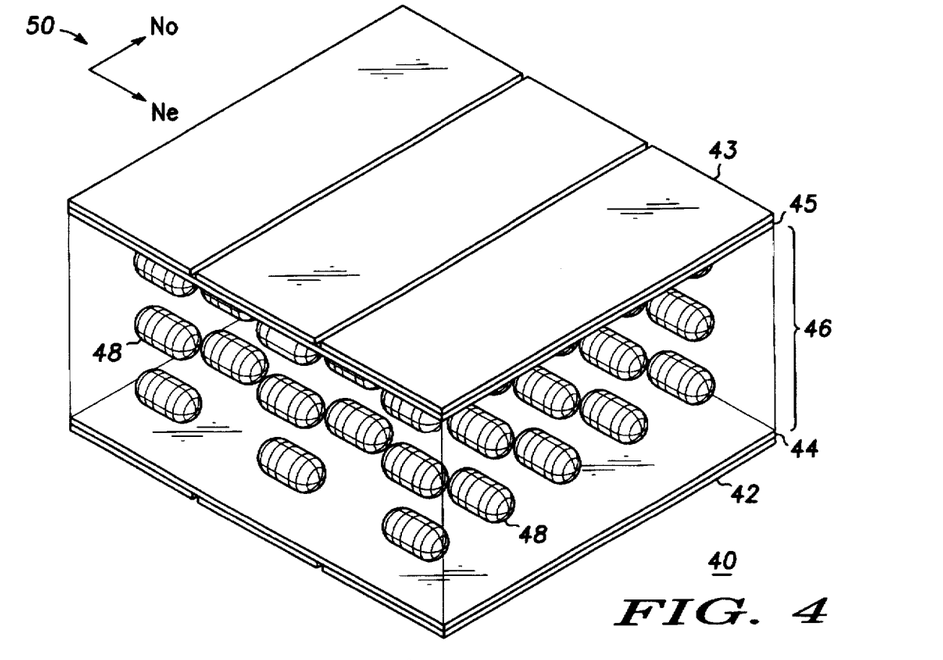
FIG. 4 is a simplified isometric view of a nematic liquid crystal cell to which no voltage is applied across the cell.
Figure 5:
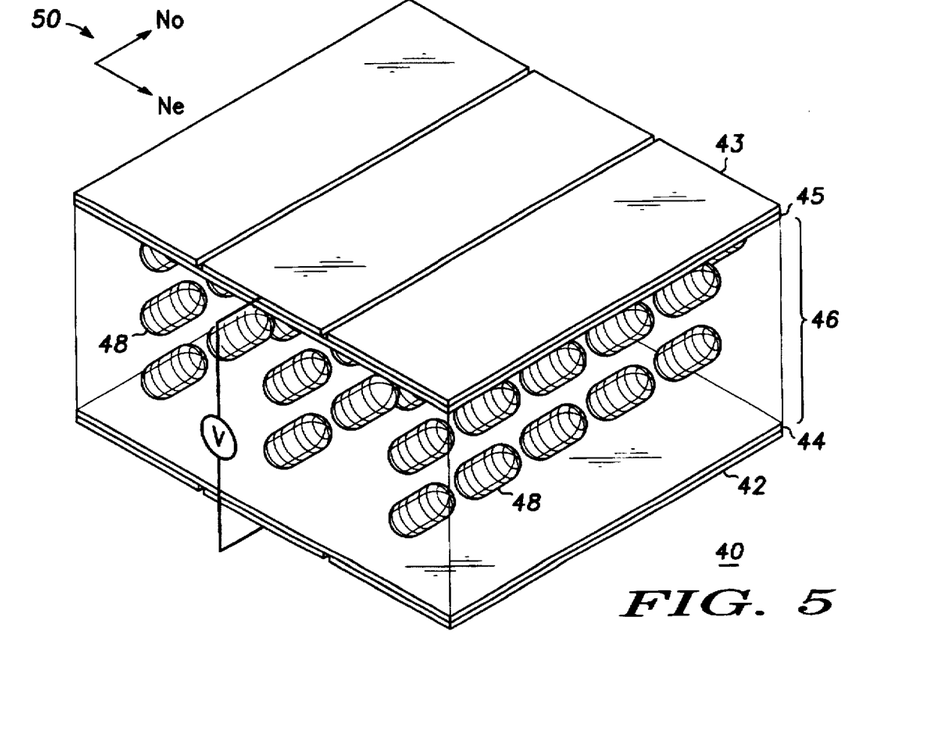
FIG. 5 is a simplified isometric view of a nematic liquid crystal cell to which a single voltage is applied across the cell.
Figure 6:
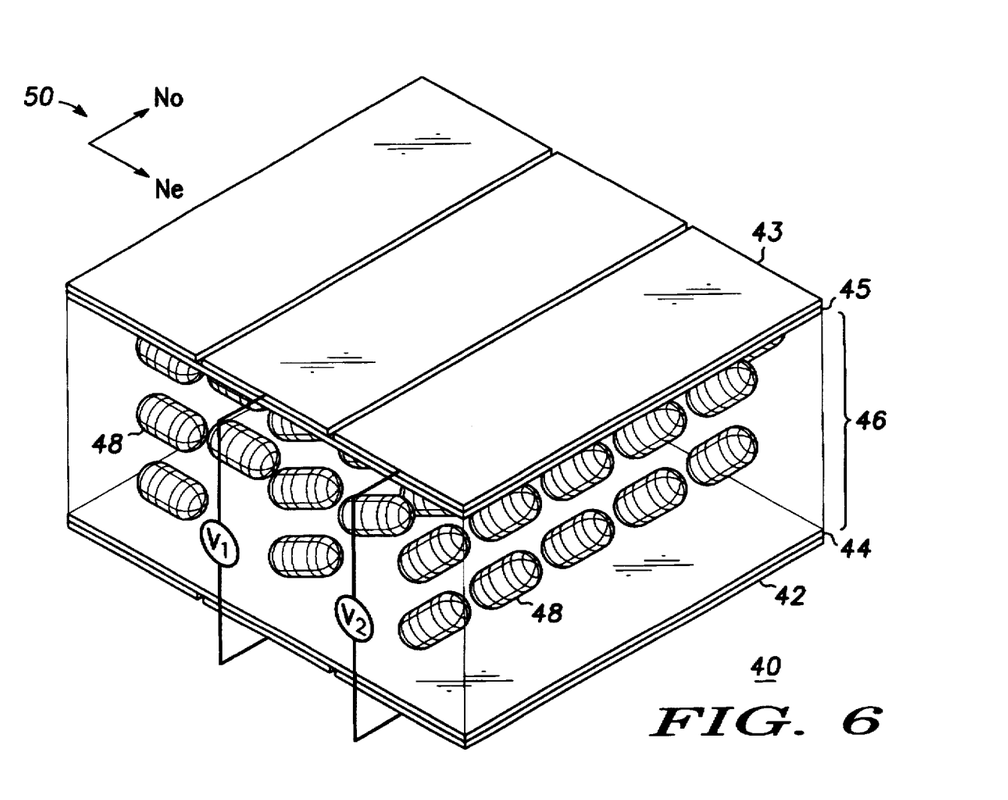
FIG. 6 is a simplified isometric view of a nematic liquid crystal cell to which varying voltages are applied across the cell.

Illustrated in FIGS. 4–6 are simplified isometric views showing the molecular orientation of a liquid crystal cell 40 having no voltage applied, a voltage applied thereacross, and varying voltages applied thereacross, respectively. Referring to FIG. 4, specifically illustrated is a liquid crystal cell 40, composed of essentially two layers 42 and 43 of electrically conductive material, two molecular alignment layers 44 and 45, and having positioned therebetween a nematic liquid crystal material 46 composed of a plurality of molecules 48. The fabrication of liquid crystal cell 40 is generally fabricated as described with regard to FIGS. 1–3.

Illustrated is liquid crystal cell 40 having aligned a long axis of molecules 48 in the direction of the extraordinary optical axis ($N_e$) exemplified by the directive arrows 50. FIG. 4 illustrates the positioning of molecules 48 when no external stimulus or voltage (V) is applied across the cell. Illustrated in FIG. 5 is liquid crystal cell 40, having equally applied thereacross a voltage (V). In the presence of voltage (V), molecules 48 of liquid crystal material 46 tilt to a certain angle, thereby modulating the phase of light passing therethrough. Illustrated in FIG. 6 is liquid crystal cell 40 when, having applied to a first sub-cell 52 defined by electrically conductive material layers 42 and 43, no voltage (V) thereby aligning the molecules 48 of liquid crystal material 46 in the direction of the extraordinary optical axis ($N_e$). There is applied to a second sub-cell 53, defined by patterned conductive material layers 42 and 43, a first voltage ($V_1$), thereby reorganizing the molecular structure of the liquid crystal material 46 by tilting to a certain angle molecules 48. There is applied to a third sub-cell 54 defined by patterned conductive material layers 42 and 43 a second voltage ($V_2$), greater than the first voltage ($V_1$), thereby changing the molecular orientation of the liquid crystal material 46 falling within sub-cell 54, by tilting molecules 48 to a greater angular degree than those molecules falling within sub-cell 53. Accordingly, it should be understood that varying voltages can be applied across a single liquid crystal cell to achieve a varying molecular orientation, thus varying the phase modulation.

Figure 7:
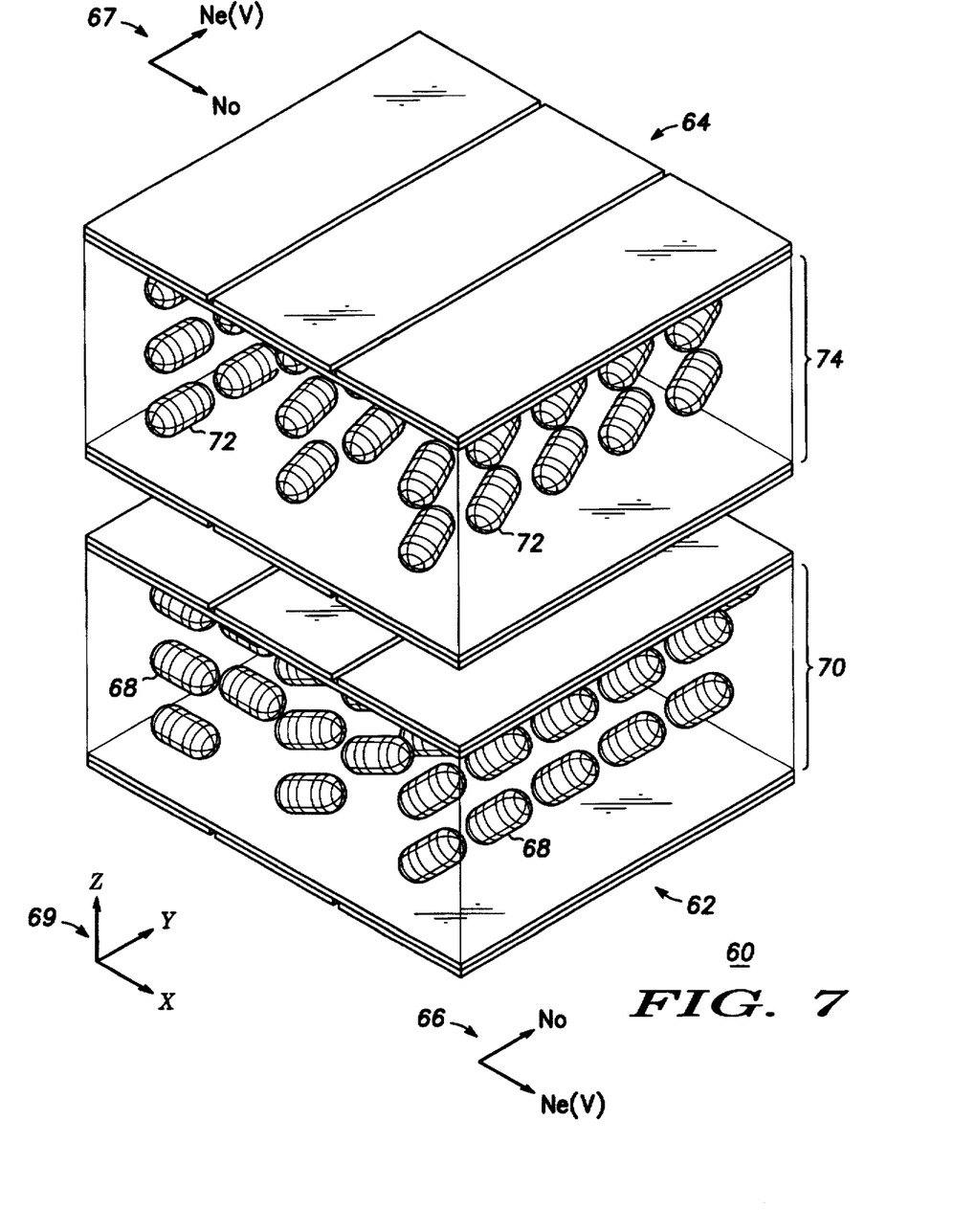
FIG. 7 is a simplified exploded isometric view of the nematic liquid crystal scanner, or beam steerer, of the present invention, illustrating fabrication of two separate cells.

As previously stated, the liquid crystal scanner of the present invention is formed of a first liquid crystal cell and at least one additional liquid crystal cell, aligned so as to have the extraordinary optical axis ($N_e$) of each cell aligned orthogonal, or perpendicular, to that of the cell aligned next to it. Simply stated, the cells are aligned in orthogonal relationship, dependent upon their extraordinary optical axis ($N_e$). Referring now to FIG. 7, illustrated in simplified exploded isometric view is a liquid crystal scanner 60 of the present invention. Liquid crystal scanner 60 is composed of a first liquid crystal cell 62 and a second liquid crystal cell 64. As exemplified by the diagrammatic directional arrows 66 and 67, first liquid crystal cell 62 has a plurality of molecules 68 defined within a liquid crystal material 70, substantially aligned with their extraordinary optical axis ($N_e$), as illustrated by directional arrows 66, along the x-axis as illustrated by directional arrow diagram 69, and having an ordinary optical axis ($N_o$) along the y-axis as illustrated in diagram 69. Second liquid crystal cell 64 is illustrated having a plurality of molecules 72 defined within a liquid crystal material 74 of cell 64, substantially aligned with their extraordinary optical axis ($N_e$), as illustrated by a directional arrow diagram 67, along the y-axis, and having an ordinary optical axis ($N_o$), as shown in diagram 67 along the x-axis as illustrated in diagram 69. Accordingly, as illustrated cells 62 and 64 have extraordinary optical axis ($N_e$) which lie in orthogonal relationship, and which vary dependent upon the voltage applied across each sub-cell of cells 62 and 64. This orthogonal alignment of the two extraordinary optical axis ($N_e$) allows the phase of the light passing therethrough to be substantially modulated regardless of its polarization, thereby increasing the total throughput of the light steered by the nematic liquid crystal scanner 60 to substantially 100%. It should be understood that some small percentage of light, or energy, will be lost through reflection, diffraction or scattering.

As illustrated in the exploded view of scanner 60 of FIG. 7, liquid crystal cell 62 and liquid crystal cell 64 are separately fabricated and mounted one to the other utilizing any optically transparent index matching adhesive material, such as optically transparent epoxy, or the like. During fabrication and dependent upon the desired use of scanner 60, scanner 60 is fabricated to operate in either a transmissive or reflective mode. When operating in a transmissive mode, scanner 60 is fabricated utilizing two transmissive liquid crystal cells 62 and 64, each generally similar to liquid crystal cell 10, described previously. Accordingly, light emitted by a light emitting display device passes through scanner 60 and undergoes two phase modulations.

In an alternative embodiment, when liquid crystal scanner 60 is required to operate in a reflective mode, one of the liquid crystal cells 62 or 64, dependent upon the direction of the light entering scanner 60, is fabricated to be reflective, generally similar to liquid crystal cell 10' or 10", previously described in conjunction with FIGS. 2 and 3. In the instance where scanner 60 is fabricated to operate in a reflective mode, the light emitted therethrough undergoes four phase modulations as the light passes once through scanner 60 and is then reflected back through scanner 60 upon exiting.

Figure 8:
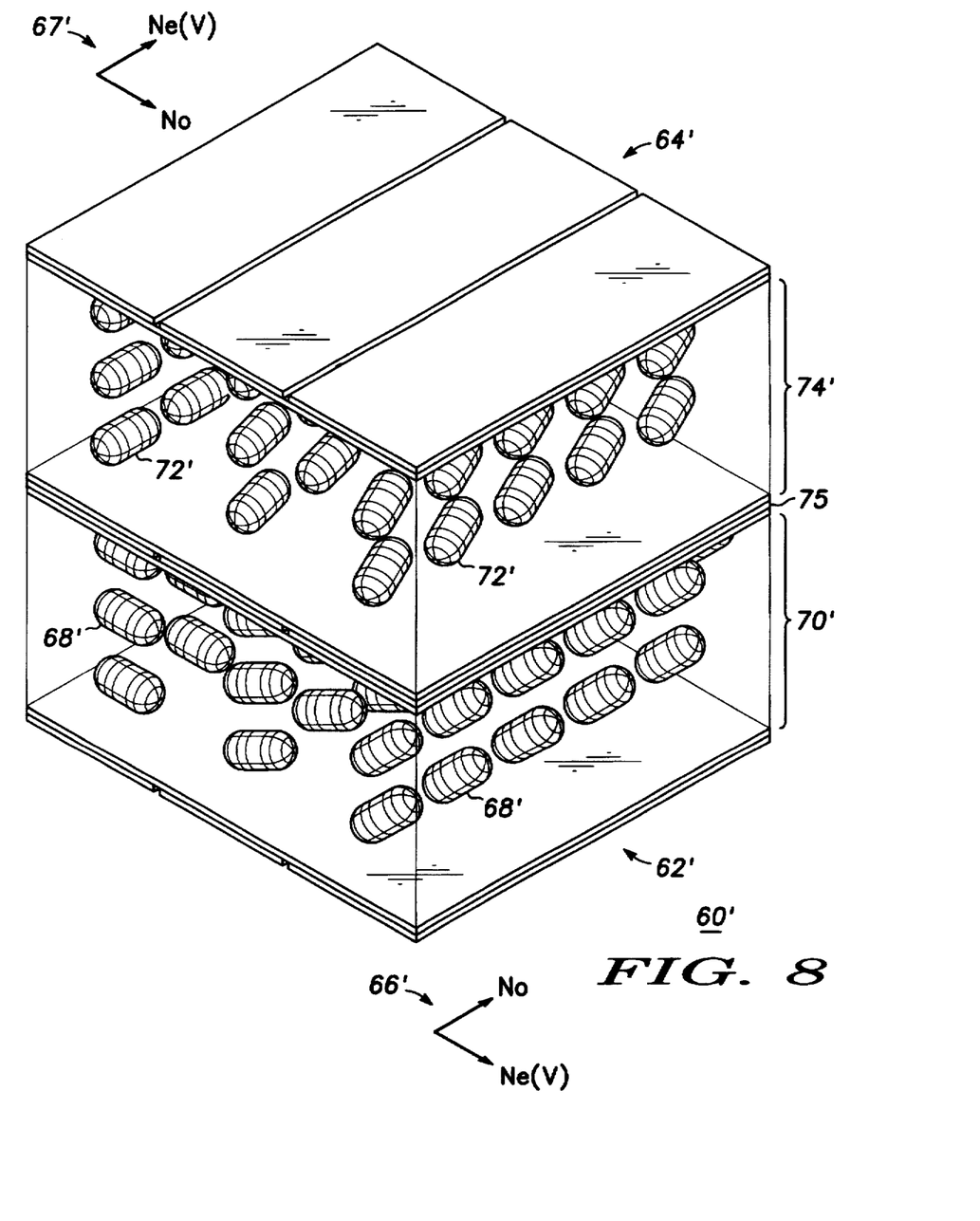
FIG. 8 is a simplified isometric view of the nematic liquid crystal scanner, or beam steerer, of the present invention, illustrating fabrication of two cells integrally formed to share a common intermediate substrate element.

In an alternative embodiment, as illustrated in FIG. 8, a liquid crystal scanner 60' is fabricated with a first liquid crystal cell 62' and a second liquid crystal cell 64' that share an intermediate substrate layer, or element, 75. Liquid crystal scanner 60' is fabricated similar to liquid crystal scanner 60, generally defined by liquid crystal cell 62', composed of a plurality of molecules 68' of liquid crystal material 70', and liquid crystal cell 64', composed of a plurality of molecules 72' of liquid crystal material 74', except that in this embodiment, intermediate substrate layer 75 has positioned overlying or patterned thereon opposite surfaces defined by substrate 75, one of the layers of conductive material of each cell 62' and 64'. Accordingly, cell 62' and 64' are integrally formed, each having their extraordinary optical axis ($N_e$) aligned orthogonal to the other and as illustrated by the directional arrow diagrams 66' and 67'.

During operation of liquid crystal scanner 60 of the present invention, a voltage, such as that supplied by an external power source, is applied across cells 62, and 64 thereby reorienting the molecules of the liquid crystal contained within the cells 62 and 64 of scanner 60. In particular, a different voltage is applied to each sub-cell defined by the patterned electrically conductive material of each cell 62 and 64. In the instance where cell 62 and 64 are fabricated as illustrated in FIG. 8, a common ground voltage can be utilized due to the common intermediate substrate 75. The applied voltage(s) are along the same direction for both cells 62 and 64. The voltage(s) are allowed to vary along the x-axis, for one-dimensional beam steering, and are uniform along the y-axis. The application of these voltage(s) results in a change of effective extraordinary index of refraction ($N_e$) for each cell 62 and 64. The phase shift caused by the applied voltage is given by the formula $$[N_e(V)-N_e(0)]k\cdot 1,$$

where $k=2\pi/\lambda$, $\lambda$=wavelength, and l=thickness of the liquid crystal cell.

To accomplish one-dimensional beam steering, two liquid crystal cells, generally similar to cells 62 and 64, are stacked one on top of another, and a one-dimensional or two-dimensional light emitting device is utilized as the image source. The light passing through scanner 60 undergoes a phase variation in the x-direction, controlled by the applied voltage(s) and is spatially modulated to increase display resolution in the resultant integrated image. The resultant integrated image is viewable by the observer as a two-dimensional image.

To accomplish two-dimensional beam steering, an alternative embodiment (not shown) of the liquid crystal scanner of the present invention is disclosed. Specifically, disclosed is an embodiment incorporating two pairs of liquid crystal cells, each pair generally similar to scanner 60 of the present invention, more specifically four individual liquid crystal cells, are aligned and stacked so that the extraordinary optical axes ($N_e$) of the four cells are positioned orthogonal to each other. An image source, capable of emitting light through the four aligned liquid crystal cells is positioned along the optical axis of the scanner. During operation, different voltages are applied to the sub-cells, or pixels, of one of the pairs of liquid crystal cells along an x-direction, and to the sub-cells, or pixels, of the other pair of liquid crystal cells along the y-direction. Accordingly, the light entering the scanner undergoes a variation in phase in both the x-direction and the y-direction and can be spatially modulated to increase display resolution in the resultant integrated image. The resultant integrated image is viewable by the observer as a two-dimensional image.

It should be understood that the voltage(s) applied to each sub-cell of each liquid crystal cell which compose the scanner of the present invention, must be equal in magnitude at the same x or x-y position to cancel any polarization effect. Additionally, it should be understood that this disclosure is not limited to scanning devices, and can apply to programmable focus/defocus lenses. The material of the scanning device is not limited to the use of nematic liquid crystal as disclosed in the preferred embodiment, and other types of liquid crystal materials, as well as scanners utilizing other phase modulating materials are anticipated by this disclosure. It should be understood that this concept of beam steering can be utilized in all beam steerers relying on birefringence effect steering, such as PLZT steerers, or the like.

Thus, a new and improved nematic liquid crystal phase spatial light modulator composed of a plurality of liquid crystal cells and driver/control circuits is provided. The liquid crystal scanner of the present invention is meant to be incorporated into a visual display system, more specifically an electro-optical system, additionally composed of an light emitting display device which serves as an image source, driver/control circuitry and optical elements (discussed presently). The visual display system includes various additional optical components while conveniently integrating electrical connections to the components and providing external connections thereto. Light sources, polarizers, diffusers and optics are conveniently integrated into the system which is easily integrated into portable electronic equipment. It is further disclosed that additional optical elements, such as polarizer plates or layers, refractive elements, diffractive elements, etc. may be easily positioned exterior the visual display system.

It should be understood that the resultant integrated image generated by the visual display system, composed of the image source, or light emitting display device, the phase spatial light modulator, driver/control circuits and various optical elements, is too small to properly perceive (fully understand) with the human eye and generally requires a magnification of at least 10× for comfortable and complete viewing. Accordingly, a visual display system of the present invention is typically formed within a housing, defining an optical magnifier, having integrally formed therein an optical magnification system. The optical magnifier is generally defined by a plurality of sides which compose the housing. Several examples of optical magnifiers with optical magnification systems which may have incorporated therein the liquid crystal scanner 60 of the present invention are illustrated in FIGS. 9 through 14, explained below.

Figure 9:
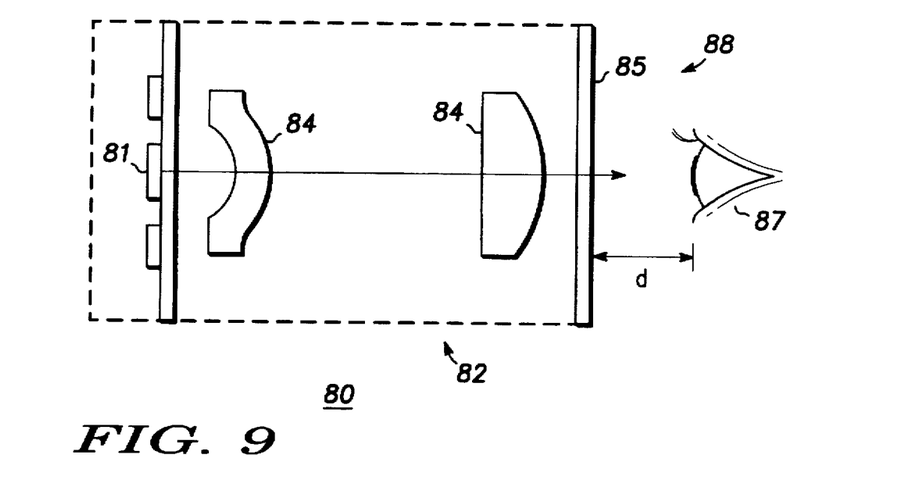
FIG. 9 is a simplified schematic view of a miniature visual image display incorporating the transmissive nematic liquid crystal scanner of the present invention.

Referring to FIG. 9, a miniature visual image display 80 is illustrated in a simplified schematic view. Miniature visual image display 80 is defined by housing 82 and includes an image generation apparatus 81 for providing an image. An optical system, represented by optical elements 84, is positioned in spaced relation to image generation apparatus 81 of miniature visual image display 80. A transmissive phase spatial light modulator 85, generally similar to liquid crystal scanner 60, previously described, is positioned to allow the light emitted by image generation apparatus 81 to pass therethrough and produces an image viewable by an eye 87 spaced from an aperture 88.

In operation, the light generated by image generation apparatus 81 passes through optical elements 84 and scanner 85. Varying external voltages are applied to scanner 85, thereby resulting in a scanning effect of the light emitted by a plurality light emitting devices of image generation apparatus 81. The resultant integrated image viewable by the eye 87 of the observer through aperture 88 appears to have a greater number of pixels and an increased aperture ratio, even though the number of pixels of the image generation apparatus 81 remains the same.

Optical elements 84, represented schematically by a plurality of optical elements mounted in spaced relation from image generation apparatus 81, receive the image from image generation apparatus 81 and magnify it an additional predetermined amount. It will of course be understood that the magnification and/or correction can be provided by any number or type of optical element and may be adjustable for focus and additional magnification, if desired, or may be fixed in a separate housing for simplicity. It should be noted that additional optical elements can be provided exterior the miniature visual image display 80 for further image magnification and/or correction.

Eye relief is the distance that eye 87 can be positioned from viewing aperture 88 and still properly view the image, which distance is denoted by "d" in FIG. 9. Because of the size of lens system 83, eye relief, or the distance d, is sufficient to provide comfortable viewing and in the present embodiment is great enough to allow a viewer to wear normal eyeglasses, if desired.

Figure 10:
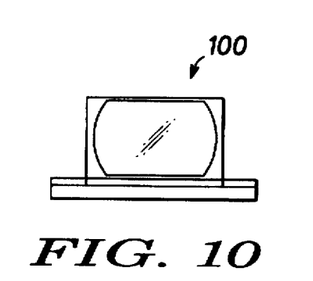
FIGS. 10, 11 and 12 illustrate a front view, side elevational view, and a top plan, respectively, of an image manifestation apparatus utilizing the nematic liquid crystal scanner of the present invention.
Figure 11:
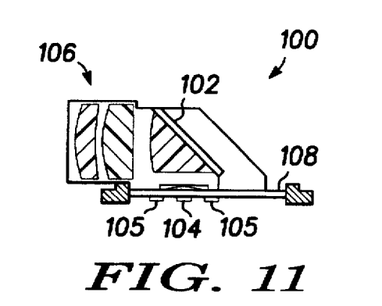
Figure 12:
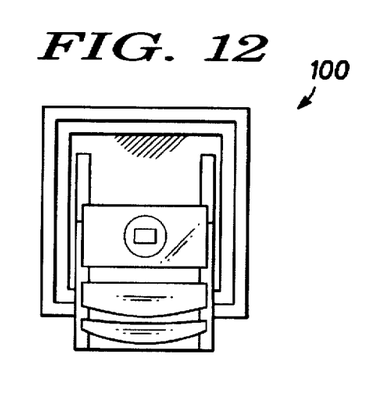

Referring now to FIGS. 10, 11 and 12, another miniature visual image display 100, in accordance with the present invention, is illustrated in a front view, side elevational view, and top plan, respectively. FIGS. 10, 11 and 12 illustrate miniature visual image display 100 approximately the actual size to provide an indication as to the extent of the reduction in size achieved by the present invention. Miniature visual image display 100 includes a reflective liquid crystal phase spatial light modulator 102, hereinafter referred to as liquid crystal scanner 102, (generally similar to liquid crystal scanner 60, described above), an image generation apparatus 104, a plurality of driver/control circuits 105, and a plurality of optical elements, which comprise an optical magnification system 106. Image generation apparatus 104 is mounted in electrical interface with a standard printed circuit board 108. Reflective liquid crystal phase spatial light modulator 102 is mounted to optical magnification system 106, thereby allowing the light emitted by image generation apparatus 104 to pass through liquid crystal scanner 102 and be reflected back through liquid crystal scanner 102 when exiting the folded optical magnifier formed by optical magnification system 106.

Figure 13:
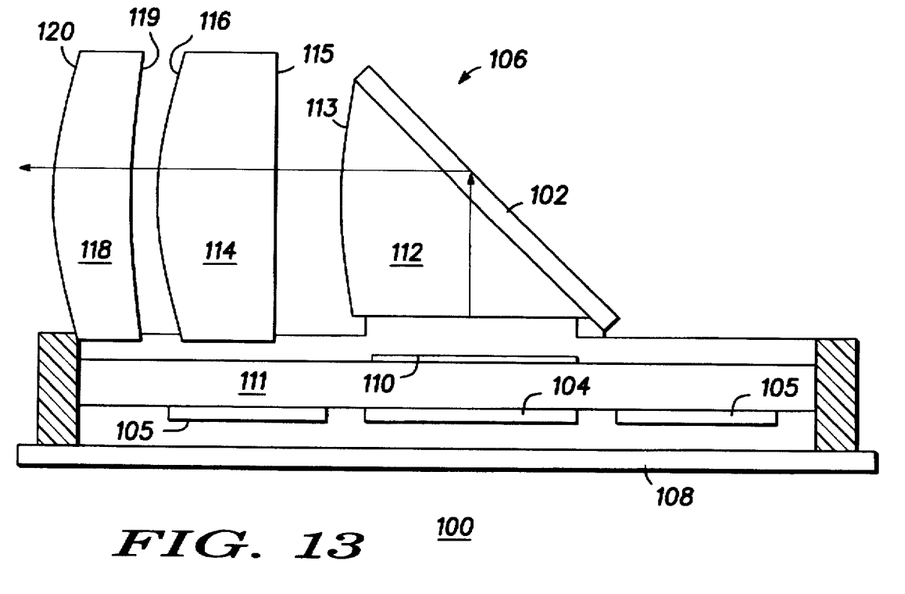
FIG. 13 is a 4× magnified view in side elevation of the apparatus of FIG. 10 utilizing the reflective nematic liquid crystal scanner of the present invention.

Referring specifically to FIG. 13, a 4× magnified view in side elevation of miniature visual image display 100 of FIG. 9 is illustrated for clarity. From this view it can be seen that reflective liquid crystal scanner 102 is mounted on an optical prism 112 so that the image generated by scanner 102 passes through a refractive surface 113. The image is then directed to an optical lens 114 having a refractive inlet surface 115 and a refractive outlet surface 116. From optical lens 114 the image is directed to an optical lens 118 having an inlet refractive surface 119 and an outlet refractive surface 120. Also, in this embodiment at least one diffractive optical element is provided on one of the surfaces, e.g. refractive inlet surface 115, to correct for chromatic and other aberrations. The operator looks into outlet refractive surface 120 of optical lens 118 and sees a large, easily discernible visual image which appears to be behind miniature visual image display 100.

Figure 14:
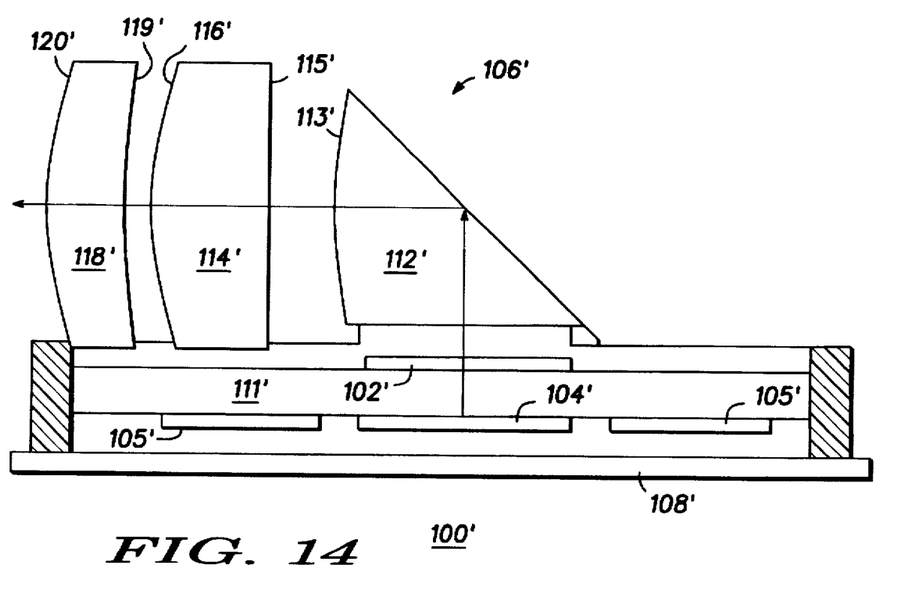
FIG. 14 is a 4× magnified view in side elevation of the apparatus of FIG. 10, utilizing the transmissive nematic liquid crystal scanner of the present invention.

FIG. 14, illustrates yet another 4× magnified view in side elevation of an alternative embodiment of the miniature visual image display of FIG. 10, referenced here as 100', utilizing the transmissive liquid crystal phase spatial light modulator of the present invention. It should be noted that all components similar to the components illustrated in FIG. 13, are designated with similar numbers, having a prime added to indicate the different embodiment or scanning technique utilized. From this view it can be seen that a transmissive liquid crystal scanner 102' (generally similar to transmissive liquid crystal scanner 60 above) is affixed directly to the upper surface of a mounting substrate 111' to which an image generation apparatus 104' is mounted. An optical prism 112' is mounted to reflect the image generated by transmissive liquid crystal scanner 102' through a refractive surface 113'. The image is then directed to an optical lens 114' having a refractive inlet surface 115' and a refractive outlet surface 116'. From optical lens 114' the image is directed to an optical lens 118' having an inlet refractive surface 119' and an outlet refractive surface 120'. Also, in this embodiment at least one diffractive optical element is provided on one of the surfaces, e.g. surface 113' and/or refractive inlet surface 115', to correct for chromatic and other aberrations. The operator looks into outlet refractive surface 120' of optical lens 118' and sees a large, easily discernible visual image which appears to be behind miniature visual image display 100'.

It is anticipated by this disclosure that the plurality of optical elements disclosed in FIGS. 9–14, include reflective elements, refractive elements, diffractive elements, polarizers, diffusers, or holographic lenses that may be mounted in overlying relationship to the image generation apparatus, specifically positioned on an interior aspect of the optical magnifiers It is further disclosed that a plurality of optical elements, including reflective elements, refractive elements, diffractive elements or diffusers may be mounted in overlying relationship to the surface of the optical magnifier through which the light, or resultant integrated image, is output, specifically positioned on an exterior aspect of a light output surface, to form an image plane for the light which forms the resultant integrated image.

Liquid crystal phase spatial light modulator 60 of the present invention is meant to be incorporated into any number of varying visual image display systems, some of which were previously described. These types of visual image display systems are ultimately intended for use in various types of electronic equipment, namely portable communications equipment, such as cellular and portable telephones, as well as smart-card reader devices, or the like.

Thus, a new and improved liquid crystal phase spatial light modulator composed of at least two liquid crystal cells which serves to spatially modulate the phase of light emitted by a light emitting display device is disclosed which is relatively easy and inexpensive to manufacture. The liquid crystal phase spatial light modulator of the present invention is intended for use in miniature visual display systems. The visual display system components ruggedly mount an image source, various optical components and the liquid crystal phase spatial light modulator scanning device, while conveniently integrating electrical connections to the components and providing external connections thereto. Light sources, polarizers, diffusers and, if desired, additional optics are conveniently integrated into the small visual display system which is easily integrated into a housing, forming an optical magnifier, for use in portable electronic equipment. It is further disclosed that additional optical elements, such as polarizer plates or layers, refractive elements, diffractive elements, etc. may be easily positioned exterior the housing. By using light emitting devices for the light source, with low fill factors, which are scanned by the liquid crystal phase spatial light modulator to generate a resultant integrated image, characterized by high resolution, the size of the system is further reduced and the electrical power required is also minimized.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. A phase spatial light modulator comprising:
   a first cell, including a nematic liquid crystal material and having connected thereto driver/control circuits;
   at least one additional cell, including a nematic liquid crystal material, positioned to align with the first cell so as to permit light to pass therethrough, further having connected thereto driver/control circuits; and
   a means for applying a voltage across the first cell and the at least one additional cell, thereby changing the structure of the nematic liquid crystal material contained therein the first cell and the at least one additional cell.

2. A phase spatial light modulator as claimed in claim 1 wherein an extraordinary optical axis defined by the first cell and an extraordinary optical axis defined by the at least one additional cell are positioned so that the extraordinary optical axis of the first cell and the extraordinary optical axis of the at least one additional cell are aligned orthogonal to one another.

3. A phase spatial light modulator as claimed in claim 2 wherein the means for applying a voltage across the first cell and the at least one additional cell includes an external power source interfaced with each of the first cell and the at least one additional cell.

4. A phase spatial light modulator comprising:
   a first nematic liquid crystal cell fabricated so that a plurality of molecules are aligned with their extraordinary optical axis along one of an x-axis and a y-axis;
   at least one additional nematic liquid crystal cell, fabricated so that a plurality of molecules are aligned with their extraordinary optical axis along one of an x-axis and a y-axis so as to align orthogonal to the extraordinary optical axis of the first nematic liquid crystal cell; and
   a plurality of driver/control circuits capable of applying at least one voltage across the first liquid crystal cell and at least one voltage along the at least one additional liquid crystal cell, thereby reorienting the plurality of molecules contained therein each of the first and at least one additional nematic liquid crystal cell.

5. A phase spatial light modulator as claimed in claim 4 wherein the first nematic liquid crystal cell and the at least one additional nematic liquid crystal cell are fabricated to share an intermediate substrate layer.

6. A phase spatial light modulator as claimed in claim 4 wherein the first nematic liquid crystal cell and the at least one additional nematic liquid crystal cell are separately fabricated, thereafter being aligned and positioned utilizing an index matching adhesive material.

7. A phase spatial light modulator as claimed in claim 4 wherein the first nematic liquid crystal cell is further defined by a plurality of layers of electrically conductive material, patterned so as to create a plurality of pixels defined in the plurality of liquid crystal molecules.

8. A phase spatial light modulator as claimed in claim 7 wherein the at least one additional nematic liquid crystal cell is further defined by a plurality of layers of electrically conductive material, patterned so as to create a plurality of pixels defined in the liquid crystal material.

9. A phase spatial light modulator comprising:
   a first liquid crystal cell including a substrate with a control circuit formed therein, the control circuit including control terminals adjacent an outer edge of the substrate and at least one electrical contact formed therein, each of the at least one electrical contact defining a liquid crystal pixel and a first electrical contact for the liquid crystal pixel, at least one molecular alignment layer positioned in overlying relationship to at least one first electrical contact, a layer of nematic liquid crystal material comprised of a plurality of molecules each defining a long axis, positioned in overlying relationship to the at least one molecular alignment layer fabricated to align the long axis of each of the plurality of molecules of the nematic liquid crystal material along one of a x-axis and a y-axis, a layer of electrically conductive material positioned to form a second electrical contact and a glass plate positioned overlying the layer of electrically conductive material; and
   at least one additional liquid crystal cell including a substrate with a control circuit formed therein, the control circuit including control terminals adjacent an outer edge of the substrate and at least one electrical contact formed therein, each of the at least one electrical contact defining a liquid crystal pixel and a first electrical contact for the liquid crystal pixel, at least one molecular alignment layer positioned in overlying relationship to at least one first electrical contact, a layer of nematic liquid crystal material comprised of a plurality of molecules each defining a long axis, positioned in overlying relationship to the at least one molecular alignment layer fabricated to align the long axis of each of the plurality of molecules of the nematic liquid crystal material along one of a x-axis and a y-axis so as to align orthogonal to the long axis of the plurality of molecules of the first liquid crystal cell, a layer of electrically conductive material positioned to form a second electrical contact and a glass plate positioned overlying the layer of electrically conductive material.

10. A phase spatial light modulator as claimed in claim 9 wherein the first liquid crystal cell and the at least one additional liquid crystal cell are aligned so that an extraordinary optical axis of the first liquid crystal cell is orthogonal to an extraordinary optical axis of the at least one additional liquid crystal cell.

11. A phase spatial light modulator as claimed in claim 10 wherein the first liquid crystal cell and the at least one additional liquid crystal cell are fabricated to share an intermediate substrate.

12. A phase spatial light modulator as claimed in claim 10 wherein the first liquid crystal cell and the at least one additional liquid crystal cell are stacked in optical alignment using an index matching optically transparent material.

13. A phase spatial light modulator as claimed in claim 12 wherein the index matching optically transparent material is optically transparent epoxy.

14. A phase spatial light modulator as claimed in claim 10 wherein the at least one additional liquid crystal cell includes three additional liquid crystal cells, the scanner thereby defining a first liquid crystal cell, a second liquid crystal cell a third liquid crystal cell, and a fourth liquid crystal cell.

15. A phase spatial light modulator as claimed in claim 14 wherein the second liquid crystal cell is positioned on top of the first liquid crystal cell, aligned so that the extraordinary optical axis of the first liquid crystal cell is orthogonal to the extraordinary optical axis of the second liquid crystal cell, the third liquid crystal cell is positioned on top of the second liquid crystal cell and aligned so that the extraordinary optical axis of the third liquid crystal cell is orthogonal to the extraordinary optical axis of the second liquid crystal cell and the fourth liquid crystal cell is positioned on top of the third liquid crystal cell and aligned so that the extraordinary optical axis of the fourth liquid crystal cell is orthogonal to the extraordinary optical axis of the third liquid crystal cell.

16. A visual display system comprising:
   an image source, comprised of a plurality of light emitting devices, each of the plurality of light emitting devices capable of emitting unpolarized light of a specific phase;
   a phase spatial light modulator, composed of a first cell and at least one additional cell, and defining at least one phase spatial light modulator pixel, positioned to receive and scan the unpolarized light emitted by the plurality of light emitting devices; and
   a plurality of driver/control circuits connected to the plurality of light emitting devices and a plurality of driver/control circuits connected to the first cell and the at least one additional cell of the phase spatial light modulator for delivering a voltage across each of the first cell and the at least one additional cell of the phase spatial light modulator, thereby changing the phase of the unpolarized light emitted by the light emitting devices, passing therethrough, and generating a resultant integrated image viewable by an observer.

17. A visual display system as claimed in claim 16 wherein the plurality of light emitting devices include one of inorganic light emitting diodes, organic light emitting diodes, field emission displays, cathode ray tubes, vertical cavity surface emitting lasers, liquid crystal displays, and electroluminescent devices.

18. A visual display system as claimed in claim 17 wherein the phase spatial light modulator includes a liquid crystal material.

19. A visual display system as claimed in claim 18 wherein the liquid crystal material is nematic liquid crystal material.

20. A visual display system as claimed in claim 18 wherein the first cell and the at least one additional cell of the phase spatial light modulator are each comprised of a substrate, electrically conductive material, at least one molecular alignment layer, a tubular glass spacer, and liquid crystal material.

21. A visual display system as claimed in claim 20 wherein the liquid crystal material contained within the first cell and the at least one additional cell of the phase spatial light modulator is positioned in a continuous layer across each of the first cell and the at least one additional cell and each control circuit of each of the first cell and the at least one additional cell includes at least one contact and at least one optically clear contact, positioned on an opposite surface of the continuous layer of liquid crystal material with the at least one contact and the at least one optically clear contact defining a pixel within the continuous layer.

22. A visual display system as claimed in claim 21 wherein the at least one contact of each of the first cell and the at least one additional cell is optically clear, thereby allowing the unpolarized light emitted by the image source to pass therethrough, and the phase spatial light modulator to operate in a transmissive mode.

23. A visual display system as claimed in claim 22 wherein the at least one contact of one of the first cell and the at least one additional cell is formed of a reflective metal, thereby allowing the phase spatial light modulator to operate in a reflective mode.

24. A visual display system as claimed in claim 17 wherein the phase spatial light modulator is fabricated to be one of non-pixelated, a single pixel and an array of pixels.

25. A visual display system as claimed in claim 24 wherein the plurality of light emitting devices of the image source are formed in a two-dimensional array.

26. An electro-optical system comprising:
   a light emitting display device, comprised of a plurality of light emitting devices, each of the light emitting devices capable of emitting unpolarized light of a specific phase;
   a liquid crystal phase spatial light modulator, comprised of at least two liquid crystal cells, each of the at least two liquid crystal cells formed of a substrate and including at least one control circuit formed in the substrate, each of the at least one control circuit including control terminals adjacent an outer edge of the substrate, at least one molecular alignment layer, electrically conductive material forming the control circuit of each of the at least two liquid crystal cells, and a continuous layer of liquid crystal material positioned so that light passing into the liquid crystal phase spatial light modulator passes through the liquid crystal material, that when having a voltage applied thereto, causes a change in phase of the light passing therethrough;
   a housing, defining an optical magnifier, having a light input and a light output, the liquid crystal phase spatial light modulator and the light emitting display device being mounted within the housing, the housing thereby encapsulating the liquid crystal phase spatial light modulator and the light emitting display device; and
   an optical magnification system, comprised of a plurality of optical elements, positioned so that light emitted by the liquid crystal phase spatial light modulator is directed through the optical magnification system, thereby generating a resultant integrated image, viewable by an observer.

27. An electro-optical system as claimed in claim 26 wherein the plurality of optical elements are molded, thereby forming a portion of the housing.

28. An electro-optical system as claimed in claim 26 wherein the plurality of optical elements are positioned within the housing.

29. An electro-optical system as claimed in claim 26 wherein the at least two liquid crystal cells of the liquid crystal phase spatial light modulator are formed of optically transparent material, thereby scanning the unpolarized light emitted by the light emitting display device, and emitting therethrough light of a different phase, thus operating in a transmissive mode.

30. An electro-optical system as claimed in claim 26 wherein one of the at least two liquid crystal cells of the liquid crystal phase spatial light modulator is fabricated to include a reflective material, thereby scanning the unpolarized light emitted by the light emitting display device as it enters the liquid crystal phase spatial light modulator, and reflecting the light back through the liquid crystal phase spatial light modulator, thereby emitting light having undergone at least two phase changes, thus operating in a reflective mode.

31. An electro-optical system as claimed in claim 26 wherein the resultant integrated image is viewable as one of a direct view image, a miniature virtual image, and a projected image.

\* \* \* \* \*